United States Patent

[11] 3,613,075

| [72] | Inventors | Thomas C. Griffiths;<br>Melvin R. Simpson, both of Chardon, Ohio |
|---|---|---|
| [21] | Appl. No. | 867,046 |
| [22] | Filed | Oct. 16, 1969 |
| [45] | Patented | Oct. 12, 1971 |
| [73] | Assignee | Eaton Yale & Towne Inc.<br>Cleveland, Ohio |

[54] TIRE INFLATION MONITORING SYSTEM
8 Claims, 3 Drawing Figs.

[52] U.S. Cl. .................................................. 340/58, 73/146.2
[51] Int. Cl. ........................................................ B60c 23/04
[50] Field of Search ............................................ 340/27, 58, 262; 303/21 A, 21 CE, 21 CF, 21 CG; 180/82, 103; 73/146.2, 146.3, 146.4, 146.5

[56] References Cited
UNITED STATES PATENTS

| 2,927,302 | 3/1960 | Steigerwald .................. | 340/262 X |
| 3,192,503 | 6/1965 | Lang ............................ | 340/27 |
| 3,233,946 | 2/1966 | Lockhart ...................... | 340/262 X |
| 3,245,213 | 4/1966 | Thompson et al. ........... | 340/262 X |

*Primary Examiner*—Alvin H. Waring
*Attorney*—Yount and Tarolli

ABSTRACT: Tire inflation is monitored by sensing the angular movement of a wheel by counting revolutions of the wheel and comparing the count with a count from another wheel or a reference to determine whether or not the wheel has the proper diameter. A low speed reset system is provided to prevent false indications that might occur when the vehicle is operating at slow speeds.

PATENTED OCT 12 1971 3,613,075

INVENTORS
THOMAS C. GRIFFITHS
MELVIN R. SIMPSON

BY Yount and Tarolli
ATTORNEYS

TIRE INFLATION MONITORING SYSTEM

The present invention relates to an apparatus for sensing the diameter or rotation of a pair of wheels of a vehicle and means for rendering the apparatus ineffective to sense the difference in diameter of the wheels when the vehicle is travelling at low speeds.

Known tire inflation monitoring systems such as the one disclosed in Beatty et al. application Ser. No. 676,891, assigned to the same assignee of the present invention, discloses means for sensing and comparing the angular movement of a pair of wheels on a vehicle. The system operates on the premise that if one of the tires of the vehicle becomes underinflated, it will rotate faster than the rest of the wheels of the vehicle as the diameter of the wheel will decrease while the surface speed will remain the same as the rest of the wheels. When the system senses a predetermined difference in the angular velocities of a tire, a signal is provided to an occupant of the vehicle to indicate that one of the tires of one of the wheels is underinflated.

Difficulties, however, may be encountered when the vehicle is travelling at slow speeds. For example, upon initial movement of the vehicle there may be relative slipping or sliding of the wheels due to excessive acceleration or abnormal road conditions. Systems of the type described may operate to indicate that one of the tires is underinflated if relative slipping of the wheels occurs. Moreover, such systems may provide false indications upon cornering of the vehicle wherein the wheels on one side of the vehicle necessarily rotates faster than those wheels on the other side of the vehicle.

Accordingly, it is an object of the present invention to provide a new and improved apparatus for monitoring the diameter of an inflated tire on a vehicle which does not provide false indications when the vehicle is travelling at slow speeds.

Another object of the present invention is to provide a new and improved apparatus for providing a signal when a tire on a wheel of the vehicle is underinflated and means for rendering the system inoperative to produce a signal when the vehicle is travelling below a predetermined speed.

A further object of the present invention is to provide a new and improved apparatus for providing a signal when a tire on a wheel of the vehicle is underinflated in which pulses are generated in response to the rotation of the wheel of the vehicle and counted over a predetermined interval normally a function of distance and a signal derived if the number of pulses received during this interval indicate an underinflated tire, and wherein the means for counting the pulses is periodically reset to a start count condition when the vehicle is travelling below a predetermined speed.

A further object of the present invention is to provide a new and improved system for indicating an underinflated tire on a wheel of a vehicle in which the angular movement of the wheel is measured to determine if the tire is underinflated, the system being such that false signals due to momentary differences in wheel velocity, such as caused by cornering at low speeds, are minimized.

A still further object of the present invention is to provide a new and improved tire inflation monitoring system having sensing means for sensing the presence of an underinflated tire on the vehicle and a frequency responsive means responsive to the frequency of rotation of a wheel of the vehicle which operates to prevent the sensing means for sensing the presence of an underinflated tire on the vehicle when the frequency of rotation of the wheel of the vehicle is below a predetermined value.

Further objects and advantages of the present invention will be apparent from the following detailed description of the preferred embodiment thereof made with reference to the accompanying drawings forming a part of the present specification for all subject matter disclosed therein and in which.

Figure 1:
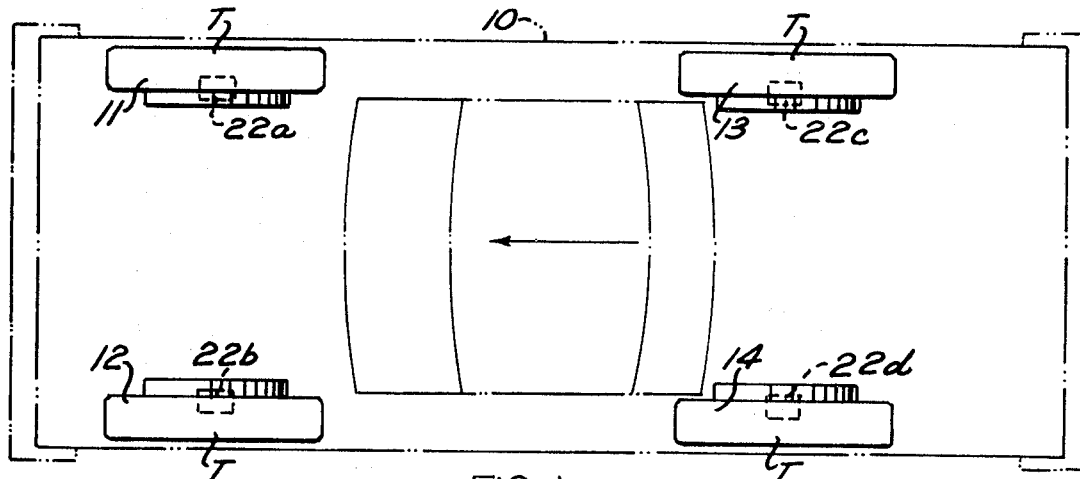
FIG. 1 is a diagrammatic showing of an automobile embodying the present invention.

In the preferred embodiment of the present invention illustrated in the drawings and described in the following specification, the presence of an underinflated tire on an automotive vehicle 10 is sensed by continuously monitoring the rotational velocities of the wheels of the automobile and indicating when one wheel of an automobile is rotating at a significantly different velocity than another wheel. In the illustrated embodiment, the angular movements of the front wheels 11, 12 are compared with each other and the angular movements of the rear wheels 13, 14 of the vehicle are compared with each other and a signal given if the angular movement of the wheels of either pair differ sufficiently to indicate an underinflated tire.

Figure 2:
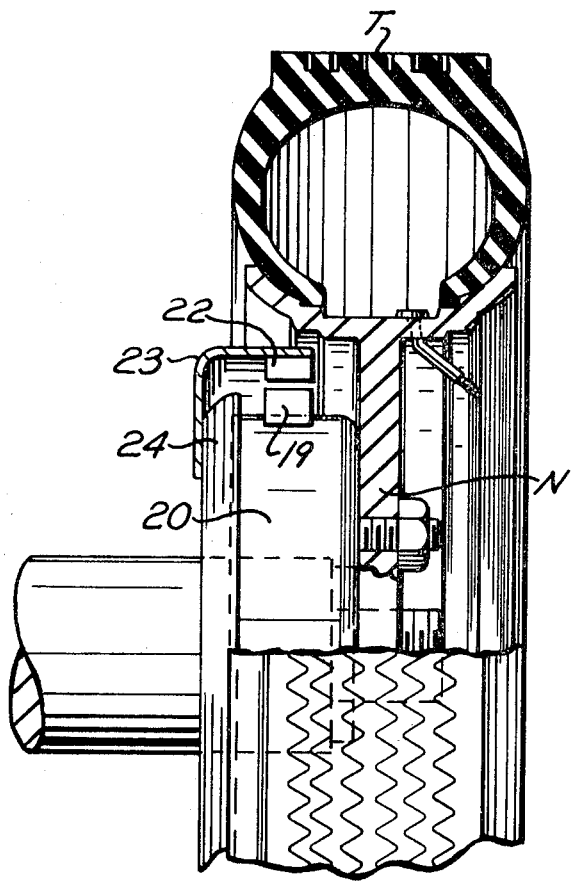
FIG. 2 is a cross-sectional view of a wheel with a revolution sensing device associated therewith.
Figure 3:
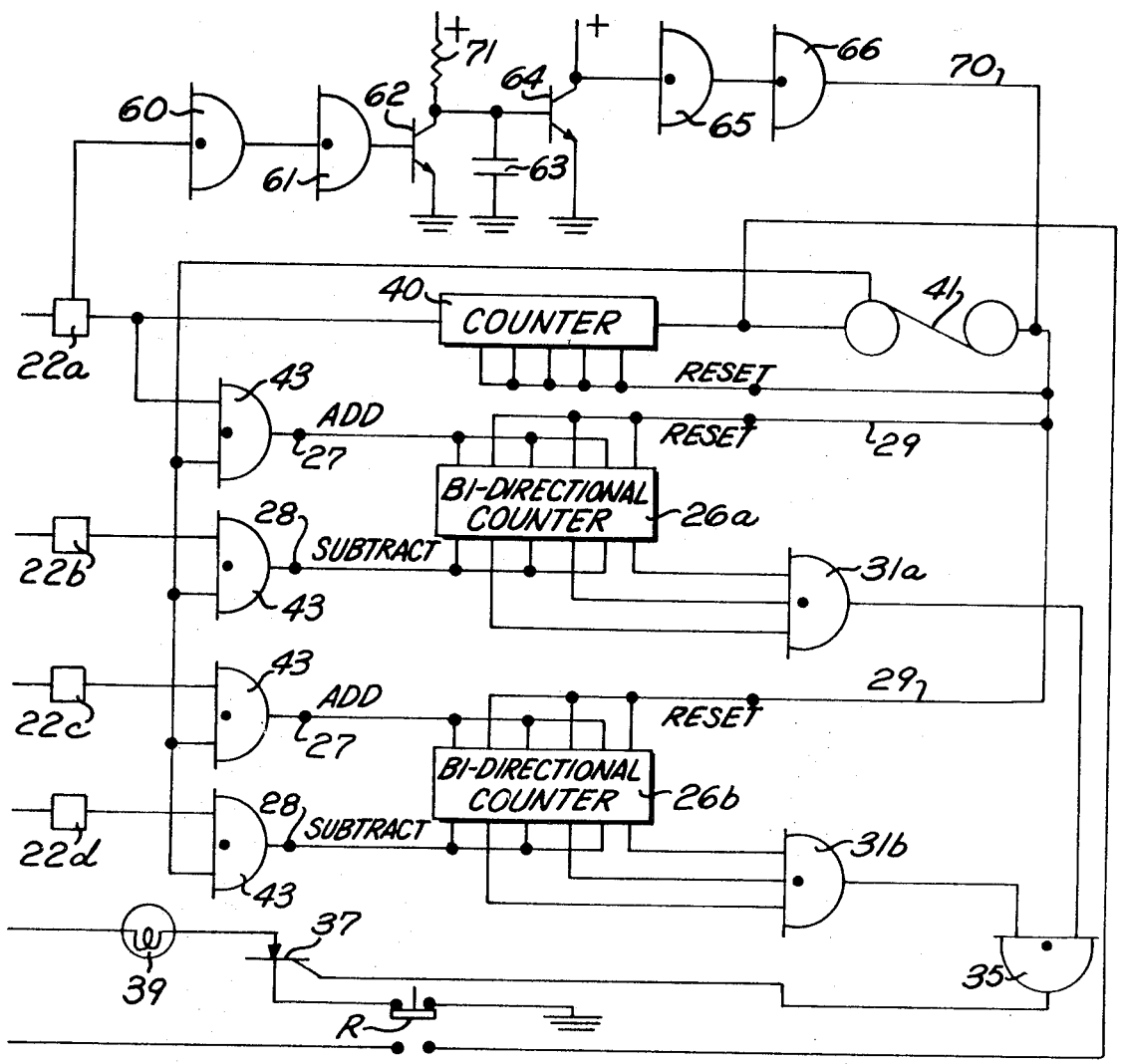
FIG. 3 is a diagrammatic view of the system for sensing an underinflated tire on the vehicle of FIG. 1.

The angular movement of each wheel is determined by counting the revolutions of the wheel. For this purpose, a block of metal 19 is mounted for rotation on the brakedrum 20 of the wheel W, see FIG. 2, and projects radially outwardly thereof to pass in close proximity to a pickup 22. The pickup 22 may be a normally open switch which is held closed by the attraction of a permanent magnet forming a part of the switch mechanism. Switch contacts are opened as the block 19 passes the switch to momentarily break an electrical circuit. The block 19 will pass the pickup 22 once for each revolution of the wheel W and thus the electrical circuit will be broken once during each revolution. The electromagnetic pickup 22 for each wheel may be mounted on a bracket 23 attached to the frame member 24 for supporting the brake shoes which operate on the brakedrum 20. The pickups for the front wheels 11, 12 are designated 22a, 22b, respectively, while the pickup for the rear wheels 13, 14 are designated 22c, 22d, respectively.

Pulses effected by the opening of the pickups 22a, 22b on the front wheels 11, 12 are fed to a bidirectional counter 26a while pulses from the switches 22c, 22d on the rear wheels 13, 14 are fed to a bidirectional counter 26b. Bidirectional counters are well known to those skilled in the art and are adapted to add a count of one to the number in the counter when a pulse is applied to an add terminal 27 for the counter and to subtract a count of one when a pulse is applied to a subtract terminal 28. Such counters may also be preset to a certain count by applying a presetting voltage to a terminal 29 of the counter. Bidirectional counters are conventionally made up of a plurality of binary stages and each stage can be preset to either a one or a zero condition by applying a voltage to a particular terminal of the stage. The preset terminal 29 is connected to a terminal of each stage to set the stage to a one or zero condition depending upon the number which is to be preset into the counter.

Output signals from bidirectional counters may also be derived when a predetermined number is registered in the counter. When a predetermined number exists in the counter, each stage has either a one or zero condition depending upon the number and an output voltage is derived from each stage to indicate that the stage is in the condition required for the number. These voltages are applied through an AND gate to an output connection so that an output appears only when all stages are in the conditions necessary for the corresponding number. In the illustrated embodiment, the counter 26a has its stages connected to the inputs of an AND gate 31a while the bidirectional counter 26b has its stages connected to the inputs of an AND gate 31b. Consequently, when the predetermined count exists in the bidirectional counter 26a or 26b where output voltages appear on all inputs to one of the AND gates 31a, 31b, the corresponding gate will be operated to indicate this condition.

In the illustrated embodiment, the AND gates 31a, 31b may be set to operate when the count in the bidirectional counter is zero. In such a condition, all the binary stages of each bidirectional counter will be in their zero state and this will be indicated by voltages on the leads to the respective AND gates. If the counter is to indicate an underinflated tire when the count therein is zero, the counter is preferably initially preset to a central number about midway between zero and the maximum count of the counter. If the counter is a three-stage binary counter, the maximum count is 7 and the counter is preferably preset to the number 4. The counter will then require three counts on the add terminal to fill to its capacity of 7 and 1 additional count to overflow and return to the counter to its zero condition. The bidirectional counter can also be returned to its zero condition by applying four counts to the subtract terminal.

During operation, the preset number plus or minus one count will exist in the counter as long as the number of pulses applied to the add and subtract terminals of the bidirectional counters are equal. This will be true as long as the pair of wheels supplying pulses to the counter are rotating at the same angular velocity.

If a tire T becomes underinflated, the diameter of the wheel decreases and the wheel rotate at a greater angular velocity since it still must move at the same surface speed as the other wheels of the vehicle. If the tire T on the rear wheel 14 becomes underinflated, the pulses which are applied to the subtract terminal 28 of the counter 26b will be greater in number than the pulses applied to the add terminal 27 and when the number of revolutions of the wheel 14 exceed the revolutions of the wheel 13 by 4, in the illustrated embodiment, the count in the counter will cause operation of the AND gate 31b to provide an output signal indicating an underinflated tire. Similarly, if the tire T on the wheel 13 becomes underinflated while the tire 14 remains normal, the add pulses will exceed the subtract pulses and the count in the counter will increase until the counter fills and returns to zero to operate the AND gate 31b.

While in the given example, the underinflated signal is given when the number in the counter is zero, such a signal could be derived for a first number in excess of the preset number and for a different number less than the preset number by providing two output AND gates for each counter. In such a system, the counter would not have to fill to capacity and one AND gate would operate at the lower number and the other AND gate operate at the higher number. It will be understood that the excess number of counts required before the underinflated signal is given may be chosen to accommodate many variable factors, such as wheel size, etc.

The outputs from the AND gates 31a, 31b and any other AND gates which might be provided for indicating that the desired count in the counter has been reached are applied through an OR gate 35 to the gate electrode of a silicon-controlled rectifier 37 to fire the rectifier and provide current through a signaling device 39, a lamp in the illustrated embodiment to indicate to the driver of the vehicle that the tire is underinflated. When the light 39 is once lighted, it is extinguished by operating a reset switch R to break the anode-cathode circuit of the SCR 37. Operation of the switch R also applies a reset voltage to trigger the multivibrator 41 to effect a resetting of the counters.

During normal operations, bidirectional counters 26a, 26b will operate to register in the counters the total difference in wheel revolutions for the wheels connected to the counters. When the car has traveled large distances, the difference in count produced by normal differences in wheel revolutions might cause the counters to falsely indicate an underinflated tire. Similarly, when the velocity of a wheel on one side of the vehicle is being compared with the angular velocity of the wheel on the opposite side, as in the described embodiment, cornering will produce a difference in angular velocity of the wheels which will be reflected in the count in the bidirectional counters. It is desirable that these factors do not cause a false indication of an underinflated tire. Accordingly, the preferred embodiment includes means for periodically resetting the counters to predetermined central counts indicating no difference in angular movements of the wheels so that the counts necessary to obtain an underinflation signal must be obtained within a predetermined time or distance interval.

In the illustrated embodiment, the bidirectional counters 26a, 26b are reset to their central count as a function of distance. To this end a counter 40 has its input connected to the output of the pickup for one of the wheels of the vehicle, the pickup 22a for the wheel 11 in the illustrated embodiment, to count the revolutions of the wheel. Each time the counter 40 fills to capacity, an output signal is applied to a one-shot multivibrator 41 which when triggered applies a presetting potential to the preset terminals 29 of the bidirectional counters 26a, 26b to reset the counters to their central number. The multivibrator 41 also preferably controls respective gates 43 for applying the pulses to the respective add and subtract terminals of the counters 26a, 26b. A gate conditioning voltage is normally applied to the gates 43 by the multivibrator 41 but this is lost when the multivibrator is triggered from its stable state by the counter 40. The gates 43 may also have a third conditioning input which is lost when it is undesirable to apply pulses to the counters, 26a, 26b, for example, the third conditioning input might be lost when the steering wheel is turned from a straight ahead position to turn the wheels of the automobile which necessarily results in a difference in angular velocity of the wheels on the opposite sides of the automobile or the input might be lost in response to braking to preclude a false comparison of wheel velocity due to the locking of only some of the wheels of the vehicle during braking.

While the counters 26a, 26b are preferably reset in accordance with the distance traveled by the vehicle, it will be understood that they might be periodically reset on a time basis although such a mode of operation would not take into account the speed of the automobile and distance traveled.

Upon initial movement of the vehicle it is desirable to provide that the bidirectional counters 26a and 26b be reset to their predetermined central number so that the monitoring system does not provide any false indications that may be a result of the counter being set to a number to which the counter has counted during previous movement of the vehicle. This may be accomplished by rendering the system inoperative to produce an underinflation signal when the vehicle is traveling at a low speed. Such a system may be provided by the provision of means for continually resetting the bidirectional counters 26a and 26b to their central number when the vehicle travels below a predetermined speed.

The provision of low speed reset means will assure that the bidirectional counters are continually being reset until the vehicle reaches a predetermined minimum velocity. When the vehicle reaches the predetermined minimum velocity the system will no longer be reset and the bidirectional counters 26a and 26b will start to count from their preset central number.

Moreover, the provision of low speed reset means will minimize false indications upon initial movement of the vehicle as a result of relative spinning or slipping of the wheels of the vehicle caused by excessive acceleration or abnormal road conditions. Because the system will be continuously reset at low speeds, the bidirectional counters will not be operative to sense spinning or slipping of the wheels.

During the normal operation of the vehicle, the vehicle will assume a relatively low speed when the vehicle is turning. Therefore, it should be further understood that the low speed reset means will also be operative to continuously reset the bidirectional counters 26a and 26b when the vehicle is turning. Thus, the system will minimize false indications as a result of the vehicle turning wherein a difference in the angular velocity of the wheels on the opposite sides of the vehicle necessarily results.

In the illustrated embodiment, the front wheel pickup 22a is normally closed and as a result a preset voltage is applied to the NAND gate 60. The NAND gate 60 applies a preset voltage to the NAND gate 61 which in turn applies a preset voltage to the transistor 62. The preset voltage that is applied to the transistor 62 when pickup 22a is closed prevents transistor 62 from conducting. When transistor 62 does not conduct a potential is applied through line 68 which causes transistor 64 to conduct and capacitor 63 to charge. The capacitor 63 charges via the resistor 71 to render the transistor 64 conductive. When transistor 64 is sufficiently conductive in response to the charging of capacitor 63, the NAND gates 65 and 66 are activated to apply a presetting potential to line 70. The presetting potential that is applied to line 70 when pickup 22a is closed is applied to the reset terminals 29 of the bidirectional counters 26a and 26b to reset the bidirectional counters to their central number and to reset terminals of the counter 40 to reset the counter 40 to its initial condition.

When the pickup 22a is opened, i.e., when the metal block 19 comes in proximity to the pickup 22a, a pulse is applied via the NAND gates 60 and 61 to the transistor 62 causing the transistor 62 to conduct. When transistor 62 is conducting the capacitor 63 will discharge and transistor 64 will stop conducting. When transistor 64 is not conducting the potential that is applied to the reset terminals of the counter 40 and the bidirectional counters 26a and 26b will not cause the counters to reset and consequently the counters 26a and 26b and 40 will continue counting.

When the vehicle is traveling at relatively slow speeds, the pickup 22a will be opened momentarily once during each revolution of the wheel W. When the frequency of opening of pickup 22a is low, the frequency of periods during which transistor 62 conducts will also be low and the periods during which the transistor 62 conducts will be relatively long. This will result in capacitor 63 reaching a sufficiently charged state during each revolution of the wheel W to effect the application of a presetting potential to line 70. It should be realized that the condenser 63 will be discharged during each revolution of wheel W as the transistor 62 will momentarily conduct for a period to discharge the condenser and then cease conducting for a much greater time period. The relative relationship of the period during which transistor 62 conducts to the period during which transistor 62 does not conduct will be dependent only upon the size of the block 19 and will be independent of speed. However, the length of the periods will vary directly with the speed of rotation of the wheels W, i.e., the faster the rotation, the shorter the periods. When the transistor 62 momentarily conducts at low frequencies, i.e., when the vehicle is traveling at a low speed, capacitor 63 will have sufficient time to be charged when transistor 62 is not conducting as the period during which transistor 62 does not conduct will be relatively large. When capacitor 63 is given sufficient time to charge during each revolution of wheel W the transistor 64 will be sufficiently conductive to activate NAND gates 65 and 66 in response to the charging of capacitor 63. The conducting of transistor 64 will effect the application of a presetting potential to reset the counter 40 and the bidirectional counters 26a, 26b as discussed hereinabove.

If the counters 26a, 26b and 40 count on the leading edge of each pulse from the pickups 22a, 22b, 22c and 22d, the counters will always be at their reset conditions during low speeds as when pulses are applied to the counters the presetting potential will be simultaneously applied to the reset terminals of the counters and the counters will never be allowed to count. If the counters 40, 26a and 26b count on the trailing edge of the pulses the counters will register one pulse which will then be erased during the same revolution of the wheel when the wheel is traveling at a slow speed when the capacitor 63 becomes charged and transistor 64 starts to conduct. It should be obvious that at low speeds capacitor 63 becomes charged and transistor 64 becomes sufficiently conductive to effect the application of a presetting once during each revolution of the wheel W and therefore the monitoring system will be inoperative to count higher than one and thus indications of differences of velocity of the wheels will not be registered by the system.

The rate at which capacitor 63 charges is determined by the value of the capacitor 63 and the value of the resistor 71. By changing either the value of the capacitor 63 or the resistor 71, the time which the capacitor 63 needs to be charged and thus the minimum speed at which the monitoring system ceases to be continuously reset can be varied.

When the vehicle reaches a speed which is higher than the predetermined maximum speed at which the monitoring system is desired to be continuously reset, the frequency of the momentary opening of pickup 22a will increase so that the counters 40, 26a and 26b will not be continuously reset. When the frequency of opening of pickup 22a is high, the transistor 62 will conduct momentarily at a relatively high frequency. Moreover, at high speeds the duration of the period during which transistor 62 does not conduct will become short and capacitor 63 will not have sufficient time to become charted enough to enable transistor 64 to reach a sufficiently conductive state to effect application of the presetting potential to the reset terminals of counter 40 and the bidirectional counters 26a and 26b. This will result in capacitor 63 being discharged prior to becoming sufficiently charged by the conducting of transistor 62.

It should therefore be apparent that the tire inflation monitoring system is only operable to indicate an underinflated tire when the vehicle is traveling above a predetermined speed and that the predetermined speed can easily be preset by controlling the valve of the resistor 71 and the capacitor 63.

While a particular system has been utilized to provide a low speed reset for the tire monitoring system, it will be appreciated that other embodiments could be utilized to provide a low speed reset. For example, the pickup 22a could apply a pulse for each revolution of the wheel W to a condenser which is paralleled by a resistor. The resistor would provide for discharge of the condenser unless the pulses were applied at a predetermined frequency associated with a speed of the vehicle. The condenser could then be connected to a threshold circuit which would be operable to apply a potential to line 70. The potential that is applied to line 70 could be the presetting potential if the speed of the vehicle is not high enough and it is desired to reset the counter 40, 26a and 26b. If the speed is high enough, the potential applied to line 70 would not effect reset of the counters and the system would operate to monitor the rotational speed of the wheels of the vehicle.

It should be apparent from the foregoing that a frequency responsive means has been provided which prevents the monitoring system from sensing the presence of an underinflated tire on the vehicle when the frequency of rotation of the front wheel of the vehicle is below a predetermined value. Thus, the inherent disadvantages of the prior art tire inflation monitoring systems have been overcome. It should be realized that while the frequency responsive means are illustrated as sensing the frequency of rotation of a front wheel of the vehicle, it is contemplated that any of the wheels of the vehicle could be utilized to drive the frequency responsive means to effect a resetting of the counters. Moreover, it will be understood that the angular movements of the front wheels and the rear wheels on one side of the vehicle or diagonally related wheels may be compared to sense an underinflated tire. If the angular movements of the wheels on the same side of the vehicle are compared, the effects of cornering on wheel velocity may be further minimized.

While a particular system has been utilized to compare the angular movement of one wheel with another wheel, it will be appreciated that the basic concept of the present invention contemplates the use of other sensing systems. For example, a tachometer may be driven by each wheel and the output voltages of the tachometer compared and a control function performed when the outputs differ in a predetermined manner. In such a system, a time delay would be introduced into the circuit for actuating the underinflated indicator to overlook differences in velocity when cornering, etc. As an illustration of this system, the tachometer outputs may be applied to a wheatstone bridge and a relay which picks up with a time delay connected across the output terminals of the bridge so that when the relay is actuated in response to a difference voltage, it will, after a suitable time delay, if the actuating voltage is not removed, if the difference in the voltages are due to cornering, the voltages will be restored before the relay picks up.

While a preferred embodiment has been described in detail, it is to be understood that further modifications and constructions will occur to those skilled in the art. For example, a reference signal may be derived from a rotating part other than another wheel and the signal from a wheel compared with the reference.

It is claimed:

1. In a vehicle having a wheel and an inflated tire on the wheel, a tire inflation monitoring system comprising first means responsive to the angular movement of said wheel for providing a signal indicating the rate of angular movement of said wheel, second means providing a signal related to vehicle velocity, third means, including counting means for counting pulses indicative of the rotation of said wheel and said vehicle velocity, for comparing said signals, fourth means responsive to an output signal from said third means for indicating an underinflated tire on said wheel, and frequency responsive control means including first circuit means responsive to pulses indicative of vehicle velocity having a frequency below a predetermined level and operative upon sensing of said low frequency pulses for repeatedly resetting said counting means while the frequency of said pulses from the vehicle velocity remain below said predetermined level.

2. In a tire monitoring system as defined in claim 1 wherein said circuit comprises storage means for storing an electrical quantity with the magnitude of the quantity stored therein being a time function of the magnitude of an electrical signal applied thereto, means for applying an electrical signal to said storage means, and means responsive to said pulses indicative of vehicle speed for repeatedly discharging said storage means at a frequency dependent on the pulse frequency, said circuit effecting a resetting of said counting means when said storage means has a predetermined magnitude of said electrical quantity stored therein.

3. In a tire monitoring system as defined in claim 2 wherein said storage means comprises a condenser and said means responsive to said pulses to discharge said storage means is responsive to each pulse to effect a discharge of said condenser.

4. In a tire monitoring system as defined in claim 1 wherein said control means comprises a storage circuit for storing an electrical quantity in response to an electrical signal applied thereto with the magnitude of the stored quantity being a time function of the magnitude of said electrical signal, means for applying an electrical signal to said storage circuit for establishing a stored quantity therein and circuit means for periodically discharging said stored quantity at a frequency which is a function of wheel speed, and means responsive to the magnitude of said stored quantity to render said tire monitoring system ineffective.

5. In a tire monitoring system as defined in claim 4 wherein said storage means comprises a condenser charged by said electrical signal.

6. In a tire monitoring system as defined in claim 1 wherein said pulses indicative of vehicle speed are derived from a pulse generator responsive to the rotation of the front wheel of the vehicle.

7. In a tire monitoring system as defined in claim 4 wherein said pulses indicative of vehicle speed are from a pulse generator responsive to the rotation of the vehicle wheel and said control means is responsive to said pulses.

8. In a tire monitoring system as defined in claim 7 wherein said pulse generator is responsive to the rotation of a front wheel of said vehicle.